May 31, 1927.
C. D. TUSKA
1,630,874
MOLD FOR VARIOMETERS
Filed March 8, 1923          2 Sheets-Sheet 1
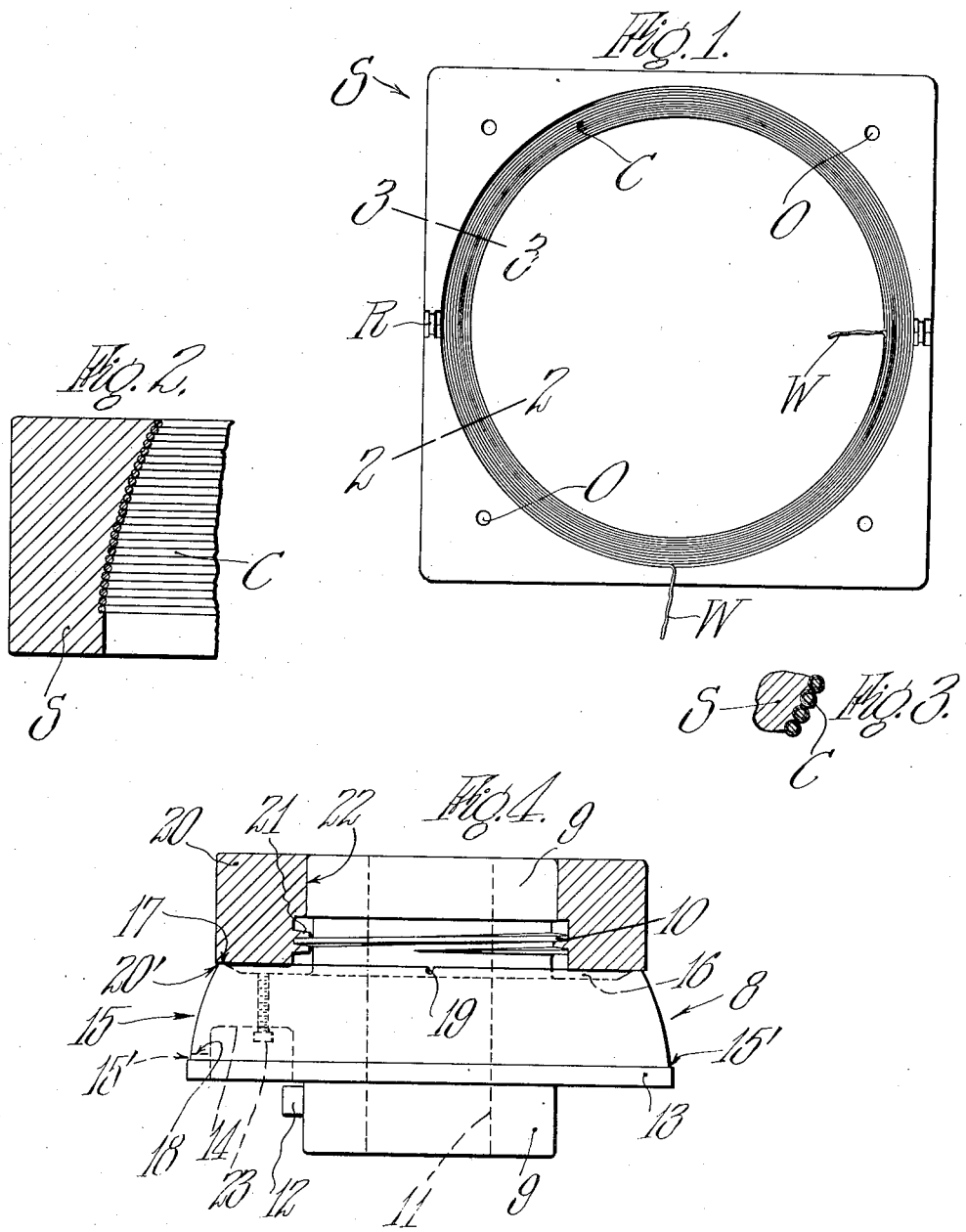
INVENTOR
Clarence D. Tuska
BY Chapin & Neal
ATTORNEYS May 31, 1927.
C. D. TUSKA
1,630,874
MOLD FOR VARIOMETERS
Filed March 8, 1923
2 Sheets-Sheet 2
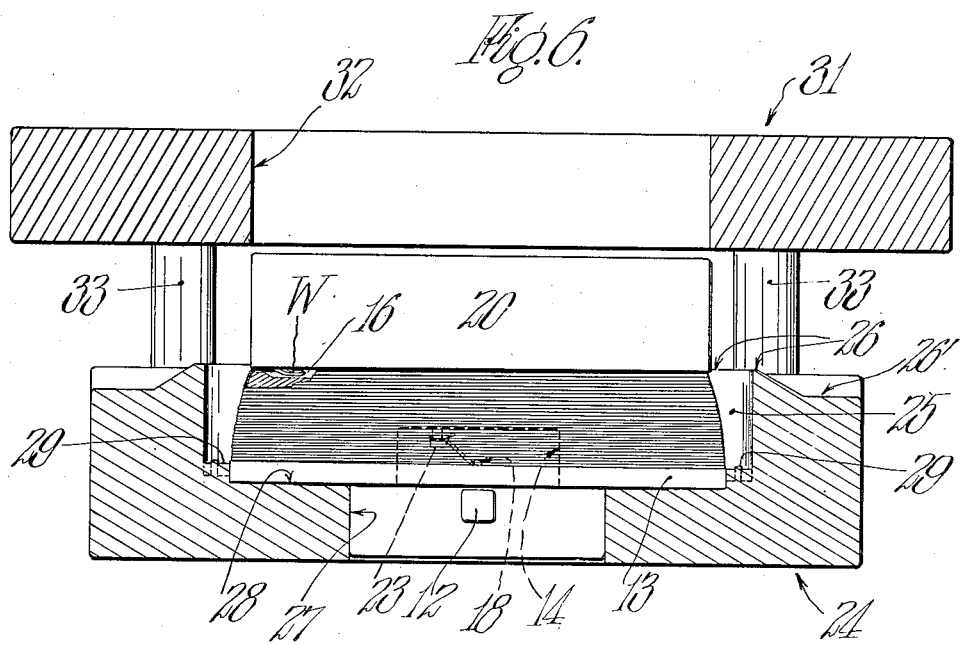
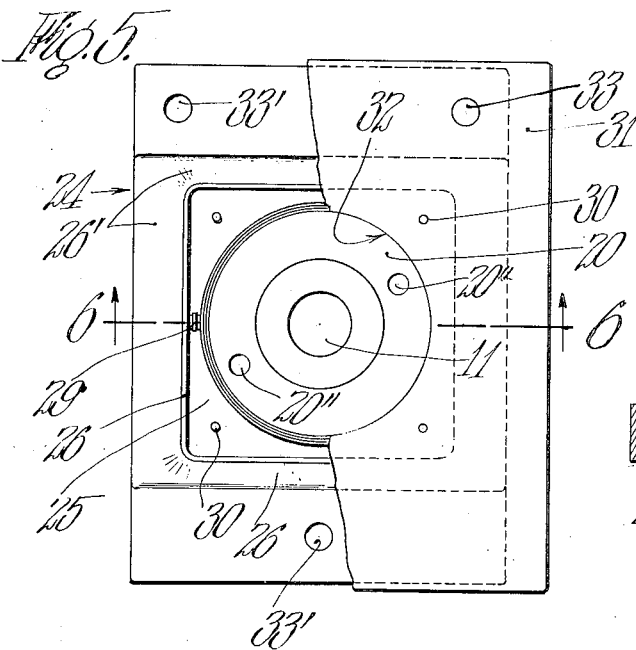
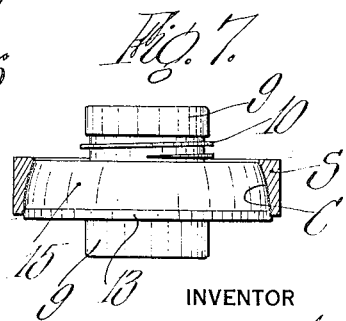
INVENTOR
Clarence D. Tuska
BY Chapin & Neal
ATTORNEYS

Patented May 31, 1927.

1,630,874

UNITED STATES PATENT OFFICE.

CLARENCE D. TUSKA, OF HARTFORD, CONNECTICUT, ASSIGNOR TO THE C. D. TUSKA COMPANY, OF HARTFORD, CONNECTICUT, A CORPORATION OF CONNECTICUT.

MOLD FOR VARIOMETERS.

Application filed March 8, 1923. Serial No. 623,816.

This invention relates to improvements in molding devices and methods for facilitating the molding of certain parts of radio apparatus.

More particularly, the invention has to do with the securing by a molding action of a band of hollow wire coils into the surface of an insulating block or holder, such for instance, as the coil windings of a variometer stator block or similar member.

Such members, whether stator or rotor, which have hollow coil windings supported upon an inner annular surface have heretofore been difficult to manufacture properly and economically because of the great care required to evenly lay the coils and secure them permanently against the hollow supporting surface. Various expedients have been adopted for this purpose, the most common being to wind the coils upon a shaping core in the form of a band, then after plastering the band with suitable dope for retaining its shape, removing it from the core and pressing it into contact with the inner surface of its holder securing it thereto by cement or other suitable adhesive.

Such previous methods are defective for the reason that the band of coils does not maintain its shape perfectly in being transferred from the core to its final holder, and also because it is almost impossible to provide a core which will be a perfect complement to the interior surface of the holder for every different band of wound coils, the result being that the coils become distorted and uneven in their final resting place. The value of the coil holder is consequently lessened both in appearance and in functioning qualities for radio use.

The present invention aims to avoid the above difficulties by providing a mold, and a removable core to serve as a winding mandrel for the band of coils whereby the material of the holder, which may be of any suitable hardening insulating plastic, may be molded around the coil windings and with sufficient pressure to embed the windings securely in the inner surface of the holder. In this manner a perfect fit of the holder upon the band of coils is attained and also an even non-distorted positioning of the windings in its holder is secured.

A further object of the invention is to provide a core or winding mandrel having a removable shoulder to facilitate the proper laying of the coils thereon and which can be removed after the molding operation to withdraw the core. Means are also preferably provided to receive the free ends of the coil windings so as not to embed the same in the holder during the molding operation.

With these ends in view the invention consists in the features of construction, combination, and arrangement of parts hereinafter described and claimed, the advantages of which will be apparent to those skilled in the art.

In the preferred embodiment of the invention shown in the drawings:

Fig. 1 is a plan view of a stator-block or holder having a stator coil embedded therein;

Fig. 2 is a section on the line 2—2 of Fig. 1;

Fig. 3 is an enlarged fragmentary section showing the coil windings embedded in the wall of a stator block;

Fig. 4 is a side elevational view of the core or coil winding member with its removable shoulder partly in section;

Fig. 5 is a plan view of the apparatus with a portion of the press plate broken away;

Fig. 6 is a section taken on the line 6—6 of Fig. 5;

Fig. 7 is an elevational view at a small scale showing the core or coil winding member having a stator block thereon, and the shoulder of the core removed.

The preferred embodiment of the invention is illustrated in connection with the molding of a stator block of a variometer having an inner surface in the shape of a segment of a sphere for holding the usual coil windings. It will be understood, however, that the invention is applicable for general application where it is desired to mold various articles having coils or groups of wires embedded in the surfaces thereof.

In order to facilitate a clear understanding of the invention and its operation such a stator block as previously referred to will first be described with particular reference to Figs. 1, 2, and 3, in which a substantially rectangular shaped stator block S is shown having a stator coil C embedded in the surface of its interior opening. Loose free ends W of the coil C are ordinarily desired for the usual connections with the wires of other coils or the like. Openings O through the block S provide bolt holes, for coupling bolts, used in securing a pair of the blocks together to form a variometer. Recesses or grooves R are usually provided in the inner flat face of the block to serve as openings for receiving bushings or bearings for the trunnions of the rotor that is mounted within a pair of the stator blocks and constituting the variometer.

The apparatus broadly comprises a mold 24 and press plate 31 for molding or forming the stator block and a combined winding mandrel and mold core 8 that is adapted to cooperate with the said mold and press plate during the molding operation for supporting and accurately positioning the coil winding within the mold with respect to the block being molded.

The mold 24 will now be described with particular reference to Figs. 5 and 6 and comprises the mold plate 24 having therein the molding depression or cavity 25 which in the present preferred form is rectangular in shape and adapted to form the previously referred to stator block S. The end and side walls 25 of the mold depression are preferably parallel, but may diverge slightly one from the other to provide a draft to facilitate the easy removal of the molded block from the mold. The upper peripheral edges 26 of the mold sides are preferably of narrow face as shown and taper gradually to depressed upper surface 26' that surrounds the mold depression as shown for a purpose hereinafter described. A central opening 27 extends through the lower wall of the mold 24 and is provided with a key way or spline (not shown) all of which is adapted to receive an end guide 9 and key 12 of the mandrel or core 8. A circular depression or counterbore 28 is provided in the lower wall of the mold for receiving and supporting a portion of the mandrel 8. Bosses 29 carried by the lower wall of the mold extend from the side walls thereof to the periphery of said recess 28 and function to mold into the face of the block the previously referred to trunnion bushing grooves R. Upstanding pins or cores 30 are carried by the mold that are adapted to core suitable bolt holes such as O in the molded stator block, while dowel guide ways 33' are located in the member 24 that are adapted to receive and cooperate with dowels 33 fixed to the press plate as will later appear.

The press plate 31 is preferably of rectangular shape and is provided with an opening 32 therethrough as shown for snug sliding fit over the collar 20 of the mandrel. Dowels 33 previously referred to are carried by the plate that are adapted to interfit the guide openings 33' of the mold 24 and to steady or guide the said plate when being lowered over the mandrel and against the molding material within the mold.

The combined coil winding and molding core member 8 will now be described with reference to Figs. 4, 5, and 6. The member 8 preferably comprises upper and lower cylindrical guide portions 9, the former of which is adapted to be received in the guideway 27 of the mold 24 by a close fit whereby the mandrel is centered or positioned and held rigidly within the mold during the molding operation. A key 12 fixed to the lower guide 9 is adapted to interfit the previously referred to keyway in the said guideway 27 to prevent a rotation or turning movement of the member 8 during the molding of the stator block or other holder.

The mandrel 8 is preferably provided with an axial opening 11 therethrough for receiving a collet or other supporting element, on which the mandrel may be placed for the coil winding operation. A peripheral flange 13 as shown is adapted to enter the counter bore or recess 28 of the mold 24 and serves to support the member 8 within the mold. An arbor 15 or coil winding portion extends from the flange 13 and is preferably in the form of a frustrum of a sphere as shown, the larger end of which abuts the flange 13 and forms therewith a shoulder 15' against which the outer winding of the coil may be placed in the winding operation. The arbor portion 15 is here shown in the form of a frustrum of a sphere, but may be in any form desired to suit such particular requirements as are necessary in order to adapt the apparatus for use in connection with the molding of various articles. A cavity 14 is provided in the end face of the flange 13 and an opening 18 located adjacent the said flange communicates therewith, through which a free end of the wire coil is threaded and concealed during the molding operation, to prevent the said free end from being imbedded in the article being molded. A screw 23 located within the cavity is provided for receiving the free end of the coil and serves to securely anchor the said free end against displacement. The smaller end face of the winding arbor 15 is preferably depressed as best shown in Fig. 4 to form the narrow peripheral ring-like flat end face 17 and recess 16. A groove or channel 19 is provided through the said end face 17 that communicates with the recess by the means of which a free end of the wire coil is concealed and prevented from becoming imbedded in the molded article. A screw thread 10 preferably of heavy and coarse pitch is provided adjacent the small end of the arbor as shown and receives thereon a suitable collar 20 having an internal screw thread 21. The said collar is provided with an annular opening 22 adapted to slide over the upper guide 9 of the mandrel and spanner openings 20 in the outer face thereof serve as means for turning the collar upon the screw 10. The collar is preferably slightly larger in diameter than the smaller end of the arbor 15 against which it abuts and is adapted, when in abutting relation with the arbor, to cooperate therewith and form a shoulder 20' corresponding to the shoulder 15' and likewise to provide a means for the coil windings to abut against and prevent the displacement thereof on the arbor 15 until molded into the holding block.

While interengaging screw threads are shown as being preferably on the mandrel and collar, it is obvious that other means may be provided to hold the collar upon the mandrel and in abutting relation with the end face of the arbor 15.

The operation of the apparatus hereinbefore described will now be explained with reference to its adaption in the molding of stator blocks, it being understood that its general operation may deviate therefrom when the device is adapted for the molding of other articles.

The stator coil is first produced by placing the mandrel upon supporting and rotating elements of a suitable winding machine. An end of the coil wire is threaded through the groove 19 and into the recess 16 and may be secured or anchored therein by being wound about the mandrel below the threaded portion 10 thereof. The collar 20 is screwed into place to provide the shoulder 20'. The mandrel is then rotated and the coil wire guided and led thereto in such a manner as to produce a stator coil, the windings of which are preferably in close adjacency so as to form an even and closely wound stator coil. Tension or drag may be exerted upon the wire by the guiding means to insure the winding of a coil having its convolutions taut and free from sag. The coil length is limited or determined by the distance between the shoulders 15' and 20' of the mandrel and the final free end of the coil is threaded through the opening 18 and anchored to the screw 23 of the cavity 14. The stator coil is thus formed and supported upon the rigid non-yieldable mandrel, and its free ends are concealed within the recess 16 and cavity 14. The coil C and mandrel 8 which is now to function as a mold core is placed within the mold and the guide 9 and key 12 of the mandrel enter the guideway 27 and keyway provided in the mold while the flange 13 of said mandrel enters into the counterbore 28 of said mold, by means of which the mandrel rigidly supports the coil windings in a precise or definitely fixed position with respect to the mold.

The slug or charge of material for forming the stator block, which may be of any suitable insulating material in a plastic or semi-fluid state, is introduced into the mold cavity 25 in sufficient quantity to slightly overfill the capacity of the mold. The press plate 31 is next located in position over the mold by means of its dowels 33 engaging with the guides 33' of said mold after which the said plate is lowered onto the exposed surface of the molding material. During the lowering movement the opening 32 of the plate 31 slides over the collar 20 of the mandrel, which serves as an additional means to guide and steady the plate during the compression action.

The mold and plate are then preferably placed between the plates of a suitable press and subjected to sufficient pressure to compact or compress the molding material within the mold and to force the same against the coil S and its core or mandrel 8. This compressing action embeds the coil C in the surface of the holder or stator block S as shown in Fig. 3 and the surplus of material in the mold is squeezed out past the sharp edge 26 and sheared off by the plate 31. The surplus material thus sheared off is received in the depression 26'. As the material hardens or otherwise becomes set in its finally finished state the said windings become thoroughly fixed or incorporated therein.

When a quick hardening material is used the mold may if desired, be subjected to cold water, air, or the like to hasten the hardening action of the material. However, in the molding of certain articles it may be found desirable to use a molding material, such as vulcanizing rubber, or the like requiring a curing operation to solidify the block, in which case the mold and plate may be secured by clamps after the compressing operation and placed in suitable curing or heating apparatus for the said curing operation.

The removal of the molded block from the mold is effected by first drawing off the press plate 31, after which the core 8 and block S are withdrawn from the mold. The collar 20 is next removed from the mandrel 8, the removal of which, removes the shoulder 20' and permits the withdrawal of the mandrel from the molded block, it being understood that the ends W of the coil having been previously disconnected from their respective places of attachment in the concealed recesses.

It will be observed that in the operation as described the coil windings when once wound on the winding mandrel are not removed therefrom until embedded in the holder or stator block by the molding operation, which insures that a perfect winding on the mandrel may be positioned in its final resting place without disruption or otherwise disturbing the perfection of the winding.

Claims:

1. In a device of the class described, a mold for molding a holder around coil windings comprising, a core having a fixed shoulder and a removable shoulder between which the windings are placed on the mandrel and a mold having a mold cavity for receiving said core and for positioning the mandrel so that the windings are within the mold cavity.

2. In a device of the class described, a mold for molding a holder around coil windings comprising, a core adapted to serve as a winding mandrel for the coils and having a removable shoulder for abutting the coil winding on the core, said core having recessed portions removed from the mold cavity to receive the free ends of the coil windings during the molding operation.

3. In a device of the class described, a mold for molding a holder around coil windings having free ends comprising, a tapered core adapted to serve as a winding mandrel for the coils and having a removable shoulder at the smaller end of said core for abutting the coil winding on the core and recesses for receiving the free ends of the coil winding.

4. In a device of the class described, a mold for molding a holder around coil windings comprising, a core adapted to serve as a winding mandrel for the coils and having a removable shoulder for abutting the coil winding on the core coacting means between said core and mold to rigidly support the coil windings within the mold during the molding operation, said shoulder being removable to permit the removal of the molded holder and windings from the core.

5. In a device of the class described, a mold for molding a holder around coil windings, a core for receiving the coil windings and having a fixed and a removable shoulder, said core provided with recesses adjacent the said shoulders for receiving the free ends of the coil winding.

6. In a device of the class described, a mold for molding a holder around coil windings, a core for receiving coil windings, coacting means between said core and mold whereby the said core is definitely positioned with respect to the mold during the molding operation, said core having a fixed and a removable shoulder whereby the molded block may be removed from the core.

7. In a device of the class described, a mold for molding a holder around coil windings, a core for receiving coil windings and adapted to cooperate with the mold and support the windings therein comprising, a flange portion, a winding arbor adjacent thereto and forming a shoulder therewith, and a removable collar on said core to form a shoulder at the other end of said winding arbor.

8. In a device of the class described, a mold for holding a holder around coil windings, a core for receiving coil windings and adapted to cooperate with the mold and support the windings therein comprising, a flange portion, a winding arbor adjacent thereto and forming a shoulder therewith, a removable collar on the core to form a shoulder at the other end of said arbor, said arbor being provided with recesses at opposite ends thereof for receiving the free ends of the wire coil.

9. In a device of the class described, a mold comprising a cavity member and a plate member, a core for receiving coil windings and having a removable shoulder, and coacting means between said core cavity and plate members to definitely position the same within the mold during the molding operation.

10. In a device of the class described, a mold for molding a holder around coil windings comprising a cavity member and a plate member, a core for receiving coil windings and having a fixed and a removable shoulder spaced apart whereby said core member serves as a winding mandrel for the coils, and coacting means between said core and mold members to definitely position the same within the mold during the molding operation, said core having a recess adjacent each of said shoulders to receive the free ends of said coil windings.

In testimony whereof I have affixed my signature.

CLARENCE D. TUSKA.